United States Patent Office 3,812,093
Patented May 21, 1974

3,812,093
CATIONIC THIADIAZOLYL MONOAZO DYES
John G. Fisher and Gary T. Clark, Kingsport, Tenn., assignors to Eastman Kodak Company, Rochester, N.Y.
No Drawing. Filed Aug. 29, 1972, Ser. No. 284,531
Int. Cl. C09b 29/08
U.S. Cl. 260—146 R        7 Claims

ABSTRACT OF THE DISCLOSURE

This invention relates to cationic monoazo dyestuffs containing a diazotized 2-amino-1,3,4-thiadiazole coupled with selected quaternized dialkylaniline couplers having the formula

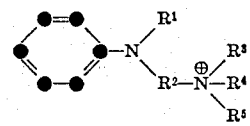

wherein
$R^1$ represents hydrogen; alkyl; alkyl substituted with cyano, phenyl or alkoxy; phenyl or phenyl substituted with alkyl or alkoxy;
$R^2$ represents alkylene, cycloalkylene, or alkylene-NHCO-alkylene;
$R^3$, $R^4$, and $R^5$ may be the same or different and each represents lower alkyl; and
A represents a basic dye anion.

These dyes impart fast orange to bluish-red shades to acrylic, modacrylic and acid-modified polyester and polyamide fibers.

---

This invention relates to novel thiadiazolyl azo dyes prepared from couplers containing an isolated cationic site. More particularly, this invention relates to basic monoazo dyestuffs prepared by coupling a diazotized 2-amino-1,3,4-thiadiazole with selected quaternized dialkylaniline couplers. These dyes impart fast orange to bluish-red shades to acrylic, modacrylic and acid-modified polyester and polyamide fibers. These dyes have superior lightfastness on the fibers mentioned above when compared to those azo compounds disclosed, for example, in U.S. 3,658,781. In addition, these dyes exhibit other advantageous properties when applied to the above-mentioned substrates.

The novel basic azo dyestuffs of this invention have the formula

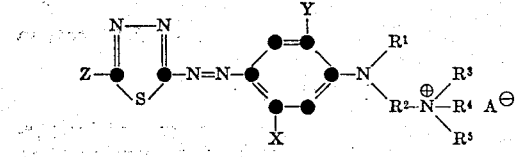

wherein
Z represents hydrogen, alkyl, alkoxy, alkylthio, benzylthio, phenylthio, halo, phenyl, or phenyl substituted with lower alkyl, halo, alkoxy, alkoxycarbonyl or acyl;
X represents —NHCO-alkyl, —NHCO-aryl, or NHSO₂-alkyl;
Y represents hydrogen, alkyl, alkoxy or halo;
$R^1$ represents hydrogen, alkyl, alkyl substituted with cyano alkoxy or acetoxy; phenyl or phenyl substituted with alkyl or alkoxy;
$R^2$ represents alkylene, cycloalkylene or alkylene-NHCO-alkylene;
$R^3$, $R^4$, $R^5$ may be the same or different and each represents lower alkyl, $R^3$ and $R^4$ with the nitrogen atom to which they are attached may be cyclized to piperidine or morpholine; or may be replaced by a 2- or 4-lower alkyl substituted pyridinium salt; and

A represents a basic dye anion.

As used herein the term "alkyl" designates a carbon content of 1 to about 18 carbon atoms. As used herein to describe a substituent containing an alkyl moiety, the word "lower" designates a carbon content of up to about six carbon atoms.

Typical of the groups representative of Z are methyl, ethyl, propyl, decyl, octadecyl, bromo, chloro, methoxy, ethoxy, propoxy, butoxy, methylthio, butylthio, ethylthio, phenyl substituted with methyl, ethyl, propyl, butyl, chloro, bromo, methoxy, ethoxy, butoxy, methoxycarbonyl, butoxycarbonyl, ethoxycarbonyl, acetyl, butyryl, propionyl, etc. Preferably, Z represents hydrogen, lower alkyl, lower alkylthio, benzylthio, lower alkoxy, halo, phenyl and phenyl substituted with lower alkoxycarbonyl. In an especially preferred embodiment of this invention Z represents hydrogen, methyl, ethyl, methylthio, ethylthio, methoxy, bromo, chloro, phenyl and phenyl substituted with methoxycarbonyl.

Typical of the groups represented by X are acetamido, propionamido, butyramido, benzamido, chlorobenzamido, —NHSO₂CH₃, —NHSO₂C₂H₅, etc. Preferably, X represents acetamido, propionamido or benzamido.

Typical of the groups represented by Y are methyl, ethyl, decyl, propyl, methoxy, ethoxy, propoxy, hexoxy, chloro, bromo, etc. Preferably Y represents hydrogen, lower alkyl, lower alkoxy, chloro or bromo. Especially preferred are hydrogen, methyl, ethyl, methoxy, ethoxy and chloro.

Typical of the groups represented by $R^1$ are methyl, ethyl, butyl, cyanoethyl, ethoxyethyl, methoxyethyl, or phenyl substituted with methyl, ethyl, butyl, ethoxy, butoxy, methoxy, etc. Preferably, $R^1$ represents lower alkyl, lower alkyl substituted with cyano of lower alkoxy; phenyl or phenyl substituted with lower alkyl or lower alkoxy.

Typical of the groups represented by $R^2$ are ethylene, propylene, butylene,

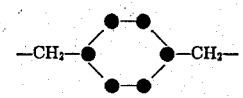

—C₂H₄NHCO—CH₂—, —C₂H₄NHCOC₂H₄—, etc. Preferably, $R^2$ represents lower alkylene or lower alkylene-NHCO-lower alkylene.

Typical of the groups represented by $R^3$, $R^4$ and $R^5$ are methyl, ethyl, propyl, butyl or $R^3$, $R^4$ and $R^5$ with the nitrogen atom to which they are attached may represent

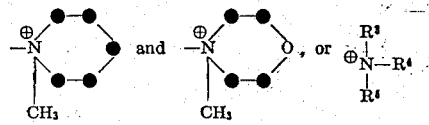

may be replaced by a 2- or 4-lower alkyl substituted pyridinium salt such as

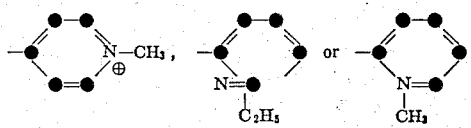

Examples of the basic dye anions represented by A include Cl⁻, Br⁻, I⁻, CH₃SO₄⁻, C₆H₅SO₃⁻, etc., the anion depending upon the method of isolation utilized and the particular quaternizing agent employed. The anion does not affect the utility of the cations of the invention as dyes nor does it affect the dye affinity of the cations for polyacrylonitrile textile materials. When the compounds are used to dye polyacrylonitrile textile material, the anion becomes associated with a positively charged ion derived from the polyacrylonitrile and is removed from the dye cation and polyacrylonitrile textile material, either in the dyebath or in a subsequent washing of the dyed polyacrylonitrile textile material. As is well known in the art, the cation of a cationic azo dye is responsible for the color of the compound and the particular anion associated with the cation is not important.

The dyes of this invention are prepared by coupling a diazotized 2-amino-1,3,4-thiadiazole with a quaternized coupler of the type disclosed hereinafter. After the coupling is completed, the dye is isolated by salting out with a suitable reagent such as NaCl and ZnCl₂. The 2-amino-1,3,4-thiadiazole and unquaternized couplers of this invention may be obtained commercially or prepared by methods described in the literature and well known to those skilled in the art.

The quaternized couplers of this invention may be prepared by reacting the tertiary amine of the side group of the coupler with an alkylating agent in an inert solvent such as toluene. Suitable alkylating agents that can be used are the dialkyl sulfates, the alkyl halides, the aralkyl halides, the alkyl esters of aryl sulfonic acids, etc. Examples of such alkylating agents include dimethyl sulfate, diethyl sulfate, ethylbromide, methyl iodide, benzyl chloride, benzyl bromide, methyl-p-toluene sulfonate and ethyl benzenesulfonate. The quaternary salt separates from the solution as it forms, thereby preventing quaternization of the aniline nitrogen atom to any appreciable extent. If any of the latter product is formed this compound will no longer be a coupler and will not be a part of the final dye.

It has been found that the above-described method is preferable to quaternization of the preformed dye because, in that case, a mixture of quaternaries is formed under mild conditions.

The preparation of the dyes of this invention is illustrated in the following equations.

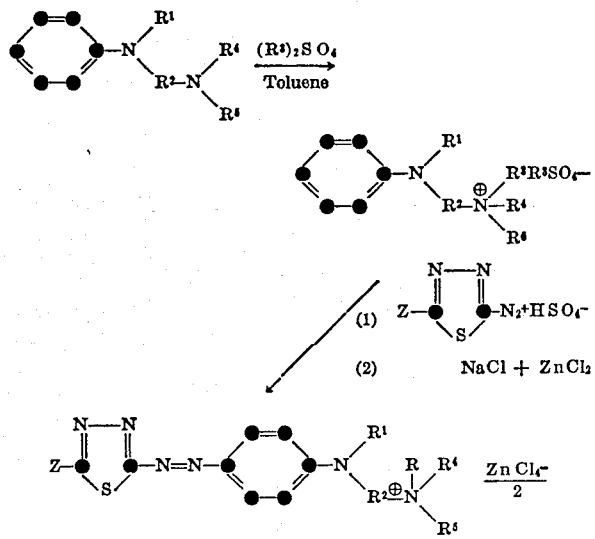

The novel basic dyestuffs of this invention and their preparation are further illustrated by the following examples.

EXAMPLE 1

To a solution of nitrosyl sulfuric acid [from NaNO₂ (3.6 g.) and H₂SO₄ (25 m.)] is added 50 ml. of 1–5 acid [propionic-acetic] below 20° C. This is cooled to 3° C., and 2-amino-5-methylthio-1,3,4-thiadiazole (7.35 g.) is added slowly keeping the temperature below 5° C. A second portion of 1–5 acid (50 ml.) is added below 5° C., and the reaction is stirred at this temperature for 2 hr. to complete the diazotization. The coupler is prepared as follows: N,β - (pyridyl - 4-ethyl)-2-methyl-5-acetamido aniline (1.48 g.) is dissolved in acetone (50 ml.) and treated with diemethylsulfate (0.5 ml.) and warmed on the steam bath. After a few minutes, a white crystalline solid separated. This is isolated, washed with a little ether and then dissolved in 1–5 acid (15 ml.). To the ice-cooled solution of the coupler is added an aliquot of the diazonium solution (12.5 ml., 0.005 m.). In order to insure complete coupling, the solution is treated with solid ammonium acetate to neutralize the mineral acid present. After a test shows the coupling to be complete, water (200 ml.) is added to the coupling mixture, and the dye is precipitated by addition of NaCl and ZnCl₂. This dye imparts fast red shades to acrylic, modacrylic and acid-modified polyester and nylon fibers and has the following structure.

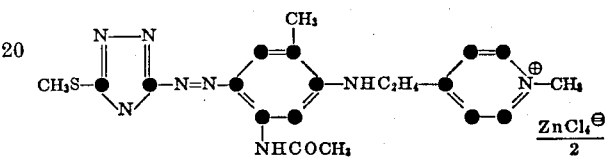

EXAMPLE 2

When the aminothiadiazole used in Example 1 is replaced by 2-amino-5-phenyl-1,3,4-thiadiazole (8.86 g.) and the other operations are carried out in the same manner, then the following dye is obtained.

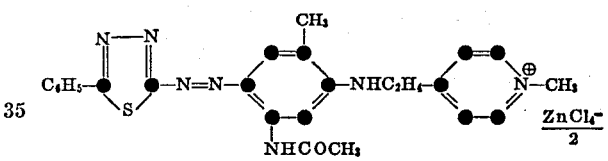

This dye imparts slightly bluish-red shades to basic dyeable fibers which have outstanding fastness properties.

EXAMPLE 3

When the coupler in Example 1 is replaced by N-ethyl-N,β-dimethylaminoacetamido-ethyl-m - acetamido aniline (1.66 g.), and the quaternization carried out in toluene (25 ml.) instead of acetone, and all the other operations carried out as described in Example 1, then the following dye is obtained.

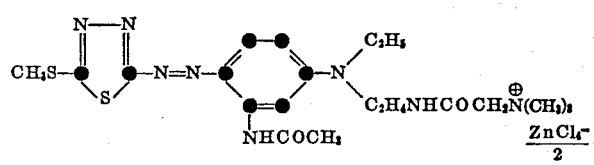

This dye imparts bluish-red shades of good fastness to basic dyeable fibers.

EXAMPLE 4

When the coupler of Example 1 is replaced by N,β-dimethylamino-ethyl - N-ethyl-m-benzamidoaniline (1.56 g.) and all other operations carried out as described, then a dye which imparts neutral red shades of good fastness to basic dyeable fibers and has the structure given below is obtained.

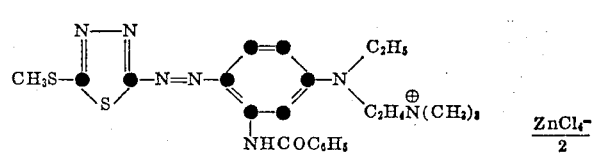

EXAMPLES 5–22

The basic monoazo compounds set forth below are prepared according to the procedures described above or by known techniques analogous to those procedures. The colors given for the following examples of the compounds of the invention refer to polyacrylonitrile fibers dyed with these compounds.

pared from ethylene glycol 5-sulfoisophthalic acid and dimethylterephthalate.

The cationic monoazo compounds of the invention can be used for dyeing acrylic and modacrylic polymer fibers,

TABLE 1

$$Z-\underset{S}{\underset{\|}{C}}\!\!-\!\!\underset{}{\overset{N-N}{\|}}\!\!-\!\!N=N-\underset{X}{\overset{Y}{\bigcirc}}-N\underset{R^2-\overset{\oplus}{N}-R^4}{\overset{R^1}{\diagdown}}\quad A^\ominus$$

| Ex. No. | Z | X | Y | R¹ | R² | R³, R⁴, R⁵ | A⊖ | Color |
|---|---|---|---|---|---|---|---|---|
| 5 | C₆H₅ | NHCOCH₃ | H | C₂H₅ | C₂H₄NHCOCH₃ | (C₂H₅)₂, CH₃ | ZnCl₄⁻/2 | Red-violet. |
| 6 | C₆H₅ | NHCOC₆H₅ | H | C₂H₅ | C₂H₄ | CH₃ | Same | Bluish-red |
| 7 | CH₃O | NHCOCH₃ | CH₃ | H | C₂H₄ | —⬡⊕N—CH₃ | do | Yellow-red. |
| 8 | Br | NHCOCH₃ | CH₃ | H | C₂H₄ | Same as above | do | Red-orange. |
| 9 | CH₃ | NHCOCH₃ | CH₃ | H | C₂H₄ | do | do | Red. |
| 10 | p-CH₃O₂C—C₆H₄ | NHCOCH₃ | CH₃ | H | C₂H₄ | do | do | Bluish-red. |
| 11 | H | NHCOCH₃ | CH₃ | H | C₂H₄ | do | do | Orange. |
| 12 | C₆H₅CH₂S | NHCOCH₃ | CH₃ | H | C₂H₄ | do | do | Scarlet-red. |
| 13 | CH₃O | NHCOCH₃ | H | C₂H₄CN | C₂H₄ | do | do | Red. |
| 14 | Cl | NHCOCH₃ | H | C₂H₅ | C₂H₄ | CH₃ | do | Orange-red. |
| 15 | p-CH₃OC₆H₄ | NHCOCH₃ | Cl | H | C₂H₅ | —⬡⊕N—CH₃ | Cl⁻ | Bluish-red. |
| 16 | CH₃S | NHCOCH₃ | H | C₆H₅ | C₂H₄ | CH₃ | Cl⁻ | Red. |
| 17 | CH₃S | NHCOCH₃ | H | C₅H₁₁* | C₂H₄ | CH₃ | Cl⁻ | Red. |
| 18 | CH₃S | NHCOCH₃ | H | C₆H₅CH₂ | C₂H₄ | CH₃ | Cl⁻ | Scarlet. |
| 19 | C₆H₅ | NHCOCH₃ | H | C₂H₅ | C₂H₄ | CH₃ | ZnCl₄⁻/2 | Red. |
| 20 | H | NHCOC₂H₅ | H | C₂H₅ | C₂H₄ | CH₃ | Same | Orange. |
| 21 | C₂H₅S | NHCOC₃H₇ | H | CH₃ | C₃H₆ | CH₃ | do | Scarlet. |
| 22 | CH₃S | NHCOCH₃ | CH₃O | C₂H₅ | C₂H₄ | CH₃ | do | Red-violet. |
| 23 | CH₃S | NHSO₂CH₃ | H | C₂H₅ | C₂H₄ | CH₃ | Cl⁻ | Do. |
| 24 | CH₃S | NHCOCH₃ | H | C₂H₅ | C₂H₄ | —N⊕⬡CH₃ (piperidinium) | ZnCl₄⁻/2 | Do. |
| 25 | CH₃S | NHCOCH₃ | H | C₂H₅ | C₂H₄ | —N⊕⬡O CH₃ (morpholinium) | Same | Do. |

* Cyclic.

The following example illustrates one way in which the cationic compounds of the invention can be used to dye acrylonitrile polymer textile material:

EXAMPLE 26

An amount of 0.1 gram of dye is dissolved by warming in 5 cc. of 2-methoxyethanol. A 2% aqueous solution of a nonionic surfactant, such as Igepal CA (a polymerized ethylene oxide-alkylphenol condensation product), is added slowly until a fine emulsion is obtained and then the dye mixture is brought to a volume of 200 cc. with warm water. Five cc. of a 5% aqueous solution of formic acid or acetic acid are added and then 10 grams of fabric made from an acrylic fiber are entered and, in the case of "Orlon 42" acrylic textile material, the dyeing is carried out at the boil for one hour. In the case of materials made of "Verel" modacrylic fiber the dyebath temperature should not exceed 90° C. in order to avoid damage to the fiber. The dyed material is then washed well with water and dried.

Polymeric linear acid-modified polyester materials of the terephthalate type are illustrative of the linear aromatic polyester textile materials that can be dyed with the compounds of our invention. Examples of linear acid-modified polyester textile materials that can be dyed with the compounds of the invention are those disclosed preyarns and fabrics a broad range of shades. Acrylic textile materials are those which consist of at least 85% acrylonitrile and modacrylic textile materials are those consisting of at least 35% but less than 85% acrylonitrile. The cationic compounds of the invention also give excellent dyeings on acid-modified acrylic textile materials such as the sulfonate-modified acrylic fibers described in U.S. Pats. 2,837,500; 2,837,501 and 3,043,811. The novel cationic compounds can also be used to dye sulfonate-modified polyester fibers such as are described in U.S. Pat. 3,018,272. Examples of the textile materials that are dyed with the cationic compounds of the invention are those sold under the trade names "Orlon," "Orlon 42," "Verel," "Acrilan," "Dynel," "Creslan" and "Dacron 64." In general, the cationic compounds when used as dyes on the described textile materials, exhibit improved fastness, for example, to washing, to alkaline perspiration, gas (atmospheric fumes) and sublimation.

Textile materials dyed by the cationic compounds of the invention are characterized by containing at least about 35% combined acrylonitrile units and up to about 95% acrylonitrile units, and modified, for example, by 65-5% of vinyl pyridine units as described in U.S. Pats. 2,990,393 (Re. 25,533) and 3,014,008 (Re. 25,539) or modified by 65-5% of vinyl-pyrrolidone units, for example, as described by U.S. Pat. 2,970,783, or modified with 65–5% acrylic ester or acrylamide units as described in U.S. Pats. 2,879,253; 2,879,254 and 2,838,470. Similar amounts of the other polymeric modifiers mentioned above are also useful. A preferred group of the copolymers readily dyeable with the dyes of the invention are the modacrylic polymers such as described in U.S. Pat. 2,831,826 composed of a mixture of (A) 70–95% by weight of a copolymer of from 30 to 65% by weight of vinylidene chloride or vinyl chloride and 70–35% by weight of acrylonitrile, and (B) 30–5% by weight of a second polymer from the group consisting of (1) homopolymers of acrylamidic monomers of the formula $$CH_2=C(R^6)-C(=O)-N(R^7)(R^8)$$

wherein $R^6$ is selected from the group consisting of hydrogen and methyl, and $R^7$ and $R^8$ are selected from the group consisting of hydrogen and alkyl groups of 1–6 carbon atoms, (2) copolymers consisting of at least two of said acrylamidic monomers, and (3) copolymers consisting of at least 50% by weight of at least one of said acrylamidic monomers and not more than 50% by weight of polymerizable monovinyl pyridine monomer.

Another type of modacrylic polymer that can be dyed with the cationic compounds of the invention is an acetone-soluble mixture of (A) 70–95% by weight of a copolymer of 30–65% by weight of vinylidene chloride and 70–35% by weight of acrylonitrile and (B) 30–5% by weight of an acrylamide homopolymer having the above formula wherein $R^6$, $R^7$ and $R^8$ are as described above. Specific polymers of that type contain 70–95% by weight of (A) a copolymer of from 30–65% by weight of vinylidene chloride and 70–35% by weight of acrylonitrile and (B) 30–5% by weight of a lower N-alkylacrylamide polymer such as poly-N-methacrylamide, poly-N-isopropylacrylamide and poly-N-tertiarybutylacrylamide.

Although this invention has been described in detail with particular reference to preferred embodiments thereof, it will be understood that variations and modifications can be effected within the spirit and scope of the invention.

We claim:

1. Basic azo dyestuffs of the formula

[Structural formula showing thiazole-azo-phenyl-amine structure with substituents Z, X, Y, $R^1$, $R^2$, $R^3$, $R^4$, $R^5$ and anion $A^\ominus$]

wherein
Z represents hydrogen, alkyl, alkoxy, alkylthio, benzylthio, phenylthio, chloro, bromo, phenyl, or phenyl substituted with lower alkyl, chloro, bromo, alkoxy, alkoxycarbonyl, alkanoylamino, acetyl, butyryl, or propionyl;
X represents —NHCO-alkyl, —NHCO-aryl or —NHSO$_2$-alkyl;
Y represents hydrogen, alkyl, alkoxy, chloro or bromo;
R1 represents hydrogen, alkyl, alkyl substituted with cyano, phenyl or alkoxy; phenyl or phenyl substituted with alkyl or alkoxy;
$R^2$ represents alkylene, cycloalkylene or alkylene-NHCO-alkylene;
$R^3$, $R^4$, $R^5$ may be the same or different and each represents lower alkyl;
A represents a basic dye anion.

2. The basic azo dyestuff according to claim 1 wherein Z represents hydrogen, lower alkyl, lower alkoxy, lower alkylthio, benzylthio, chloro, bromo, phenyl or phenyl substituted with lower alkyl, lower alkoxy, lower alkoxycarbonyl, chloro or bromo;
X represents NHCO-lower alkyl or NHCO-phenyl;
$R^1$ represents hydrogen, lower alkyl, lower alkyl substituted with phenyl; phenyl or phenyl substituted with lower alkoxy;
$R^2$ represents lower alkylene or lower alkylene-NHCO-lower alkylene; and
$R^3$, $R^4$ and $R^5$ represent lower alkyl.

3. The basic azo dyestuffs of claim 2 wherein
Z represents hydrogen, methylthio, ethylthio, methoxy, ethoxy, bromo, benzylthio, phenyl or p-methoxycarbonylphenyl;
X represents acetamido, propionamido or benzamido;
Y represents hydrogen, methyl, ethyl, methoxy, ethoxy, chloro or bromo;
$R^1$ represents hydrogen, methyl, ethyl, phenyl or benzyl; and
$R^3$, $R^4$, and $R^5$ represent methyl or ethyl.

4. Basic azo dyestuffs according to claim 1 having the formula

[Structural formula with $CH_3S$-thiazolyl-N=N-phenyl group substituted with NHCOCH$_3$, bearing -N($C_2H_5$)($C_2H_4$NHCOCH$_2$N(CH$_3$)$_3^\oplus$), anion ZnCl$_4^-$/2]

5. Basic azo dyestuffs according to claim 1 having the formula

[Structural formula with CH$_3$S-thiazolyl-N=N-phenyl with NHCOC$_6$H$_5$, -N($C_2H_5$)($C_2H_4$N(CH$_3$)$_3^\oplus$), anion ZnCl$_4^-$/2]

6. Basic azo dyestuffs according to claim 1 having the formula

[Structural formula with C$_6$H$_5$-thiazolyl-N=N-phenyl with NHCOCH$_3$, -N($C_2H_5$)($C_2H_4$NHCOCH$_2$N(CH$_3$)$_3^\oplus$), anion ZnCl$_4^-$/2]

7. Basic azo dyestuffs according to claim 1 having the formula

[Structural formula with C$_6$H$_5$-thiazolyl-N=N-phenyl with NHCOC$_6$H$_5$, -N($C_2H_5$)($C_2H_4$N(CH$_3$)$_3^\oplus$), anion ZnCl$_4^-$/2]

References Cited

UNITED STATES PATENTS

| | | | |
|---|---|---|---|
| 3,658,781 | 4/1972 | Hegar | 260—156 |
| 3,640,993 | 2/1972 | Hegar | 260—153 X |
| 3,732,201 | 5/1973 | Ramanathan | 260—158 X |
| 3,148,181 | 9/1964 | Wallace | 260—156 X |
| 3,428,621 | 2/1969 | Wallace et al. | 260—158 |
| 3,493,556 | 2/1970 | Weaver et al. | 260—158 |
| 3,639,384 | 2/1972 | Weaver et al. | 260—158 X |

LORRAINE A. WEINBERGER, Primary Examiner

C. F. WARREN, Assistant Examiner

U.S. Cl. X.R.

260—156, 158, 247.1, 247.2 A, 293.73, 293.75, 293.77, 294.8, 294.9, 295 AM; 8—41 A

PO-1050
(5/69)

UNITED STATES PATENT OFFICE
CERTIFICATE OF CORRECTION

Patent No. __3,812,093__  Dated __May 21, 1974__

Inventor(s) __John G. Fisher, Gary T. Clark__

It is certified that error appears in the above-identified patent and that said Letters Patent are hereby corrected as shown below:

Claim 4, column 9, lines 22-28, delete the formula

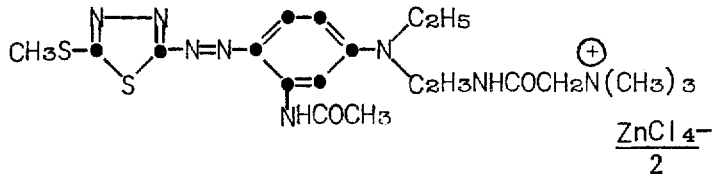

and insert in lieu thereof

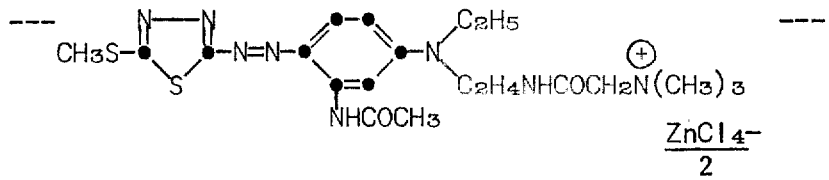

Claim 5, column 8, lines 31-37, delete the formula

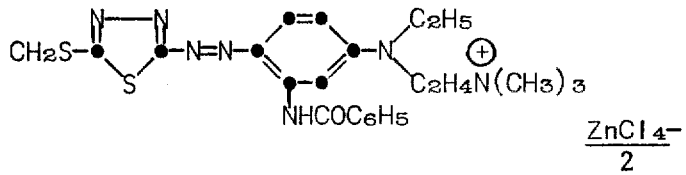

and insert in lieu thereof

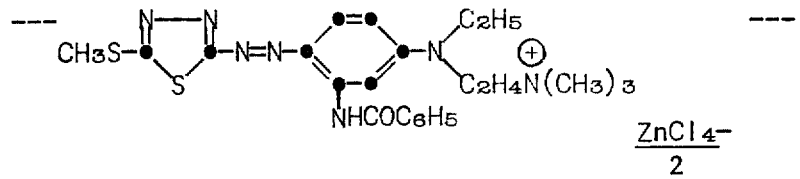

Signed and sealed this 29th day of October 1974.

(SEAL)
Attest:

McCOY M. GIBSON JR.
Attesting Officer

C. MARSHALL DANN
Commissioner of Patents